(12) United States Patent
Miura et al.

(10) Patent No.: US 7,920,952 B2
(45) Date of Patent: Apr. 5, 2011

(54) TURNING CONTROL APPARATUS FOR VEHICLE

(75) Inventors: Takami Miura, Okazaki (JP); Keiji Suzuki, Okazaki (JP)

(73) Assignee: Mitsubishi Jidosha Kabushiki Kaisha, Tokyo (JP)

( * ) Notice: Subject to any disclaimer, the term of this patent is extended or adjusted under 35 U.S.C. 154(b) by 868 days.

(21) Appl. No.: 11/586,697

(22) Filed: Oct. 26, 2006

(65) Prior Publication Data

US 2007/0112497 A1    May 17, 2007

(30) Foreign Application Priority Data

Nov. 11, 2005    (JP) .................................. 2005-327605

(51) Int. Cl.
*G06F 7/70* (2006.01)
*G06F 17/00* (2006.01)
*B60T 8/60* (2006.01)
*B60K 28/16* (2006.01)

(52) U.S. Cl. ................. 701/70; 701/84; 701/71; 701/72; 701/41; 303/146; 180/197

(58) Field of Classification Search .................... 701/69, 701/70, 72, 41, 71, 84, 88, 89; 303/140, 303/146, 147; 180/197, 157, 248, 233, 249
See application file for complete search history.

(56) References Cited

U.S. PATENT DOCUMENTS

| 4,966,250 | A | 10/1990 | Imaseki | |
|---|---|---|---|---|
| 2002/0153770 | A1* | 10/2002 | Matsuno et al. | ............... 303/146 |
| 2002/0156581 | A1* | 10/2002 | Matsuura | ....................... 701/301 |

FOREIGN PATENT DOCUMENTS

| DE | 39 19 347 A1 | 2/1990 |
|---|---|---|
| DE | 103 38 706 A1 | 3/2004 |
| DE | 195 49 715 B4 | 9/2004 |
| JP | 5-262155 A | 10/1993 |
| JP | 9-86378 A | 3/1997 |
| JP | 2853474 B2 | 11/1998 |

* cited by examiner

*Primary Examiner* — Jack Keith
*Assistant Examiner* — Muhammad Shafi
(74) *Attorney, Agent, or Firm* — Birch, Stewart, Kolasch & Birch, LLP (57) ABSTRACT

A turning control apparatus for a vehicle to improve turning ability and to avoid degradation of acceleration ability is provided. The turning control apparatus comprises a first yaw controller for adjusting at least one of driving torque of a left wheel and a right wheel; a second yaw controller for adjusting a speeds difference between a front wheel and a rear wheel; and an integrated yaw controller for controlling yaw momentum of the vehicle by managing the first and second yaw controller, wherein when the yaw of the vehicle should be reduced, the integrated yaw controller controls the first yaw controller so as to decrease the driving torque of a inside wheel, which is one of the right and left wheel and is near to a center axis of turning, and the second yaw controller so as to decrease the speeds difference between the front and rear wheel.

2 Claims, 5 Drawing Sheets

TURNING CONTROL APPARATUS FOR VEHICLE

BACKGROUND OF THE INVENTION (1) Field of the Invention

The present invention relates to a turning control apparatus for a vehicle.

(2) Description of Related Art

Techniques have been developed for improving safety of vehicles by achieving vehicle-stability during turning maneuvers. For example, JP H9-86378 Laid Open Publication discloses a feedback control, based on the yaw-rate of the vehicle, for both the torque that varies between the left and right wheels and also the different brake pressures of individual wheels.

Further, JP 2853474 Patent Publication discloses another feedback control for the Electrical Controlled Limited Slip Differential Unit of the center differential that varies the speeds between the front and rear wheels.

However, it is difficult to eliminate over-steer of vehicles during turning maneuvers by such techniques as controlling the left-right-wheel driving torques in JP H9-86378.

When a vehicle is turning, a conventional controller, which uses such techniques as those disclosed in JP H9-86378, increases the driving torque of the inside wheel, which is one of either the right or left wheels which is nearest to a center of an axis of turning.

When a vehicle is turning, the inside wheel load is decreased and the outer-side wheel load is increased, relatively. The inside wheel's grip on the road surface, that is the traction of the inside wheel, is decreased accordingly.

In this situation, the inside wheel skids easily if the inside wheel's driving torque is increased, therefore it is difficult to generate sufficient yaw of the vehicle to eliminate over-steering. Further, skidding of the inside wheel is more pronounced during acceleration of the vehicle.

During deceleration of the vehicle, the inside wheel traction is decreased and the front wheel load is increased. Accordingly, the rear wheel's load is decreased and the traction of the rear wheels is decreased, relatively.

As explained above, it is difficult to eliminate not only over-steering but also under-steering during turning maneuvers by such controlling that varies the driving torques between the left and right wheels, consequently.

Although, it is possible to accept such a technique that permits increasing the differential speed between the front and rear wheels to enhance the turning ability of a four-wheel drive vehicle in the under-steer condition, the acceleration ability of the vehicle is lost, because the overall traction of the four-wheel drive vehicle is decreased.

Assume that the rear wheel slips when the center differential does not limit the speed difference between the front and rear wheels, the rear wheel rotates faster. In this situation, the driving torque, which should be transmitted to the front wheel, is almost all transmitted to the rear wheels and consequently the acceleration is prevented.

SUMMARY OF THE INVENTION

The present invention has been developed in consideration of this situation, and it is therefore an object of the invention to provide a turning control apparatus for a vehicle, which apparatus is capable of improving turning ability and avoiding degradation of acceleration.

For this purpose, in accordance with an aspect of the present invention, there is provided a turning control apparatus for a vehicle comprising: a first yaw controller for adjusting at least one of driving torque of a left wheel and a right wheel; a second yaw controller for adjusting a speed differing between a front wheel and a rear wheel; and an integrated yaw controller for controlling yaw momentum of the vehicle by managing the first yaw controller and the second yaw controller, wherein when the yaw of the vehicle should be reduced, the integrated yaw controller controls the first yaw controller so as to decrease the driving torque of a inside wheel, which is one of the right wheel and left wheel and is near a center axis of turning of the vehicle, and the second yaw controller so as to decrease the speed difference between the front wheel and the rear wheel.

To achieve the aforementioned object, there is provided a turning control apparatus for a vehicle having at least four wheels comprising: a first yaw controller for adjusting at least one of driving torque of a left wheel and a right wheel; a second yaw controller for adjusting a different speed between front wheels and rear wheels; and an integrated yaw controller for controlling yaw momentum of the vehicle by managing the first yaw controller and the second yaw controller, wherein when the yaw of the vehicle should be reduced, the integrated yaw controller controls the first yaw controller so as to decrease the driving torque of a inside wheel, which is one of the right wheel and left wheel and is nearest to a center axis of turning, and the second yaw controller so as to decrease the different speed between the front wheel and the rear wheel.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

The embodiment of present invention will now be described with reference to the accompanying drawings.

Figure 1:
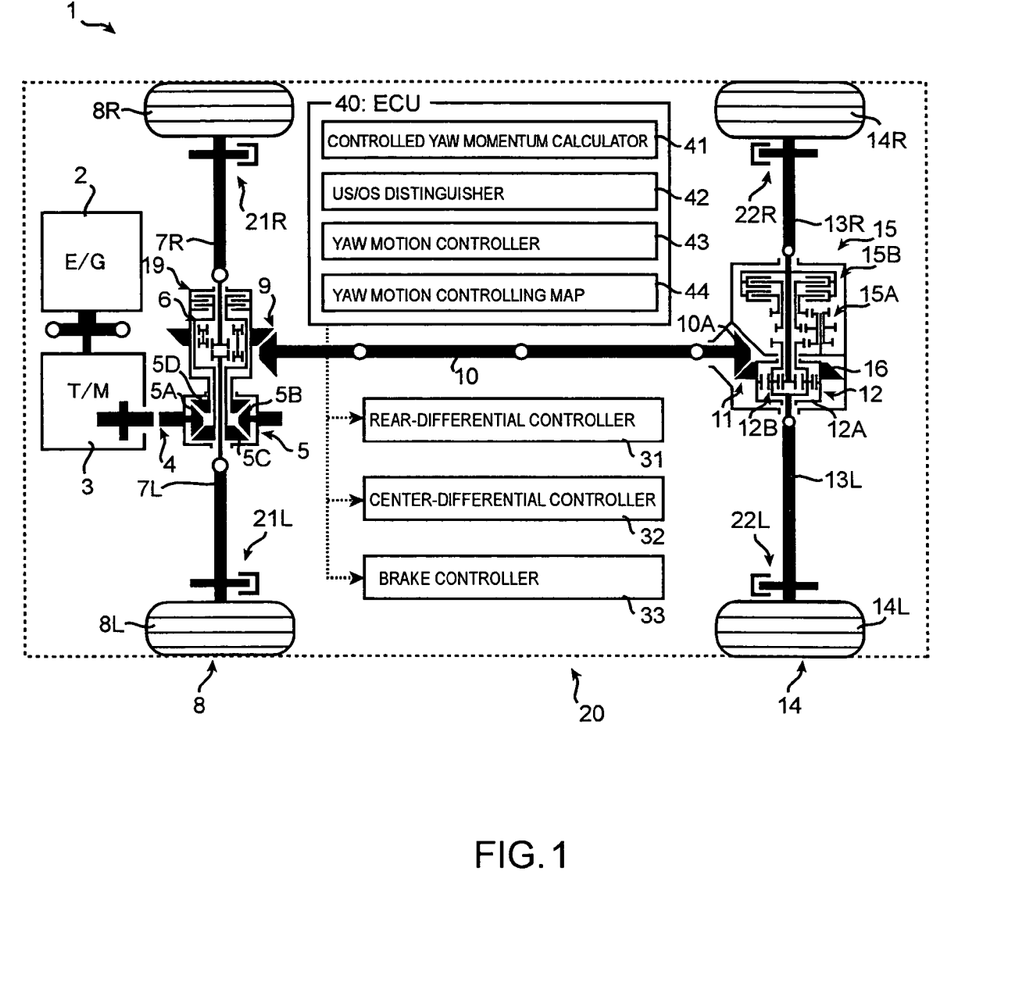
FIG. 1 is a block diagram schematically showing the entire organization of an embodiment of the present invention.

As shown in FIG. 1, an engine 2 is mounted on a vehicle 1. The torque output from the engine 2 is transmitted to a center differential 5 via transmission 3 and intermediate gear mechanism 4. The center differential 5 has a front-rear wheels limiting mechanism 19 which will be described later.

The output torque from the center differential 5 is individually transmitted to a front-right wheel 8R and a front-left wheel 8L via a front differential 6 and each of shafts 7L and 7R. And the torque output from the differential 5 is individually transmitted to a rear-right wheel 14R and rear-left wheel 14L via a front-hypoid gear mechanism 9, a propeller shaft 10, a rear-hypoid gear mechanism 11, a rear-differential 12 and each of shafts 13R and 13L. The rear-differential 12 has a right-left wheel limiting mechanism 15 which will be described later.

The front-differential 6, so-called torque-sensing type of differential, is possible to limit the difference speed mechanically between the right and left wheels 8R and 8L corresponding to the torque input from the engine 2.

The center differential 5 has differential pinions 5A and 5B, and side gears 5C and 5D engaging with the pinions 5A and 5B, respectively. The torque input from the differential pinions 5A and 5B is transmitted to rear wheels 14. Further, the center differential 5 permits front wheels 8 to rotate at a different speed from the rear wheels 14, accordingly, the ability of turning of the vehicle is secured.

The center differential 5 also has a front-rear wheel limiting mechanism 19 which can vary the degree of limitation of the speed differences between the front wheels 8 and the rear wheels 14, and can distribute variably the output torque from the engine 2 to each of the front wheels 8 and the rear wheels 14.

The front-rear wheel limiting mechanism 19 is a hydraulic multiple disk clutch that can vary the degree of limitation of speed differences between the front wheels 8 and the rear wheels 14 in response to varied oil pressure input from a driving oil pressure unit (not shown). Thus, the distributed torque is varied input to each of the front wheels 8 and rear wheels 14.

The oil pressure output from the driving oil pressure unit to the front-rear wheel limiting mechanism 19 being controlled by a center-differential controller 32 is described later.

As stated above, according to the front-rear wheel limiting mechanism 19, it is possible to improve the traction of the vehicle 1 by limiting the different speeds between the front wheels 8 and the rear wheels 14, and it is also possible to improve the turning ability of the vehicle 1 by non-limiting the different speeds between the front wheels 8 and the rear wheels 14.

Next the driving system for the rear wheels 14 will be described.

Each of the rear wheels 14R and 14L are connected to the rear-differential 12 including the right-left wheel limiting mechanism 15 for varying the difference of driving torque transmitted to each of the rear wheels 14R and 14L.

The rear-differential 12 has a case 12A. A crown gear 16 is formed around the case 12A, and a planetary gear mechanism 12B is equipped in the case 12A. The planetary gear mechanism 12B is for permitting the difference of speed between each of rear wheels 14R and 14L.

Namely, the planetary gear mechanism 12B enables transmission to the driving torque, which is input from the engine 2 to the crown gear 16 via the propeller shaft 10 and a pinion gear 10A, to each of the rear wheels 14R and 14L while non-limiting the different speed between the rear-right wheel 14R and the rear-left wheel 14L.

The right-left wheel limiting mechanism 15 includes a varying-speed mechanism 15A and a torque-transmitting mechanism 15B which can vary the output torque thereof. The right-left wheel limiting mechanism 15 is for varying, based on the signals from an ECU 40, the difference of torque between the right wheel 14R and the left wheel 14L corresponding to the driving circumstance of the vehicle 1

The varying-speed mechanism 15A varies the speed of rotation of rear left wheel 14L and outputs the torque to the torque-transmitting mechanism 15B.

The torque-transmitting mechanism 15B is a wet multiple disk clutch which enables to adjustment of the output torque based on the oil pressure input from the driving oil pressure unit.

As stated above, it is possible to vary individually the torque distributed to each of wheels 14R and 14L, using a technique that varies speed of the rear-right wheel 14R with the varying-speed mechanism 15A and which adjusts the output torque using the torque-transmitting mechanism 15B.

Hence the driving torque input to one of wheels 14R and 14L is increased or decreased by decreasing or increasing the other driving torque.

The planetary gear mechanism 12B, the varying-speed mechanism 15A and the torque-transmitting mechanism 15B have been already known, therefore, the description about these techniques is omitted in this embodiment.

The oil pressure input from the driving oil pressure unit to the right-left wheel limiting mechanism 15 is controlled by a rear-differential controller 31. The rear-differential controller 31 and control thereof will be described later.

For example, in a case where the vehicle 1 moves forward and turns right, the oil pressure is input from the driving oil pressure unit (not shown) to the right-left wheel limiting mechanism 15, then the torque transmitted to the rear-right wheel 14R is decreased, and the speed of the rear-right wheel 14R is reduced. Accordingly, the torque and speed of the rear-left wheel 14L is increased. Thereby, it is possible to generate yaw of the vehicle 1 in the clockwise direction.

The driving oil pressure unit (not shown) includes not-shown elements: an accumulator, a motor pump for compressing the oil in the accumulator, and a pressure sensor for sensing the oil pressure resulting from compression by the motor pump. The diving oil pressure unit further includes a solenoid-controlled valve for adjusting the oil pressure in the accumulator generated by the motor pump and a pressure-direction valve for selectively supplying the oil pressure from an oil chamber (not shown) in the right-left wheel limiting mechanism 15 or another oil chamber (not shown) in the front-rear wheels limiting mechanism 19.

The rear-differential controller 31 (first yaw controller) is an electrical control unit including a not-shown interface, memories and a CPU. The rear-differential controller 31 is for adjusting individual driving torque of the rear wheels 14R and 14L through the oil pressure unit in such a manner that the controller 31 sends a torque distribution signal to the driving oil pressure unit, which signal indicates the amount of oil pressure corresponding to the difference of driving torque between the rear wheels 14R and 14L, and the destination of the oil pressure, and then the controller 31 actuates the oil pressure unit to control the oil pressure supply to the right-left wheel limiting mechanism 15.

The center-differential controller (second yaw controller) 32 is an electrical control unit including not-shown elements that an interface, memories and a CPU. The controller 32 transmits a front-rear difference signal, which is a signal corresponding to a target different speed between the front wheels 8 and the rear wheels 14, to the driving oil pressure unit so that the controller 32 controls the degree of limitation for the differing speeds between the front wheels 8 and the rear wheels 14. The driving oil pressure unit varies the oil pressure input to the front-rear wheel limiting mechanism 19 at the center differential 5.

Each of wheels 8R, 8L, 14R and 14L are equipped with brakes 21R, 21L, 22R and 22L, individually. The brakes 21R, 21L, 22R and 22L are connected with a brake oil pressure unit (not shown) individually supplying the oil pressure to the brakes 21R, 21L, 22R and 22L.

Further, the vehicle 1 is equipped with a brake controller (third yaw controller) 33. The brake controller 33 is an electrical control unit including a not-shown interface, memories and a CPU.

The controller 33 transmits a brake pressure signal, which is a signal corresponding to a target brake oil pressure to-be increased or decreased at the individual brakes 21R, 21L, 22R and 22L, to the brake oil pressure unit so that the brake oil pressure unit varies the oil pressure input to each of the brakes 21R, 21L, 22R and 22L.

The brake oil pressure unit includes a motor pump and solenoid-controlled valves for a brake oil pressure system, and the unit inputs the oil pressure to the individual brakes 21R, 21L, 22R and 22L in response to orders from the brake controller 33.

As described above, each of the rear-differential controller 31, the center-differential controller 32 and the brake controller 33 are individually controlled by the ECU 40.

The ECU 40 is an electrical control unit including a not-shown interface, memories and a CPU, to which are input the results of sensing by not-shown wheel speed sensors, a steering wheel sensor, a G sensor, a yaw-rate sensor and a vehicular velocity sensor.

And the ECU 40 includes such program files stored in the memory (not shown) as a controlled yaw momentum calculator 41 (target yaw relative value setting means), a US/OS distinguisher 42 and a yaw motion controller (integrated yaw controller) 43. Further, in the memory, a yaw motion controlling map 44 is also stored, which map 44 is used by the yaw motion controller 43.

The controlled yaw momentum calculator 41 calculates the controlled yaw-momentum $M_{Z-C}$ which is amount of the yaw should be added to the vehicle 1 to make the turning according to the driver's intention.

Figure 2:
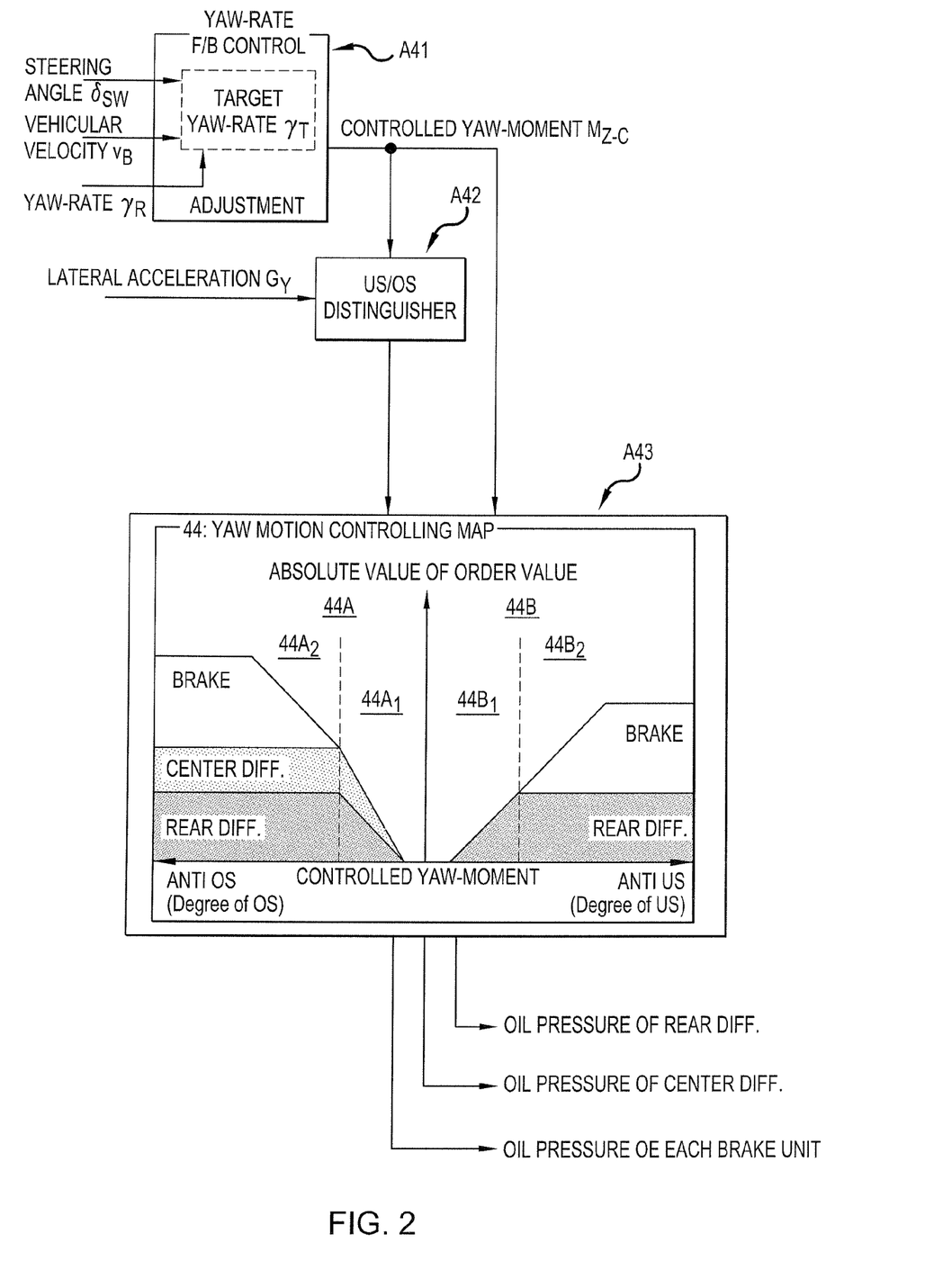
FIG. 2 is a block diagram schematically showing a manner of control in the embodiment of the present invention.

In other words, as shown by arrow A41 in FIG. 2, the controlled yaw momentum calculator 41 obtains the controlled yaw-momentum $M_{Z-C}$ in such a manner that the calculator 41 calculates a theoretical target yaw-rate (target yaw relative value) $\gamma_T$, based on the steering angle $\delta_{SW}$ sensed by the steering wheel sensor and the vehicle's velocity $v_B$ sensed by the vehicular velocity sensor. Further, the controlled yaw momentum calculator 41 executes a feed back control based on an actual yaw-rate $\gamma_R$, and compares between the theoretical target yaw-rate $\gamma_T$ and an actual yaw-rate $\gamma_R$ sensed by the yaw-rate sensor and then adjusts the theoretical target yaw-rate $\gamma_T$ based on the result of comparison.

The US/OS distinguisher 42 is for distinguishing the turning state of the vehicle 1. Specifically, as shown by arrow A42 in FIG. 2, the US/OS distinguisher 42 distinguishes the turning condition of the vehicle 1, based on the controlled yaw-momentum $M_{Z-C}$ obtained by the controlled yaw momentum calculator 41 and the acceleration $G_Y$ in the lateral direction of the vehicle 1 obtained by the G sensor (not shown), from (A) the under-steering condition, which is a condition whereby under-steering is occurring at the vehicle 1, or (B) the neutral-steering condition, which is a condition whereby neither under-steering nor over-steering is substantially occurring at the vehicle 1, or (C) the over-steering condition, which is a condition whereby over-steering is occurring at the vehicle 1.

The yaw motion controller 43 is for generating the yaw motion at the vehicle 1 corresponding to the controlled yaw-momentum $M_{Z-C}$ by managing the rear-differential controller 31, the center-differential controller 32 and the brake controller 33.

Specifically, the yaw motion controller 43 obtains the order values for each of the rear-differential controller 31, the center-differential controller 32 and the brake controller 33 by applying to the yaw motion controlling map 44 the controlled yaw-momentum $M_{Z-C}$ obtained by the controlled yaw momentum calculator 41 and the result of the US/OS distinguisher 42 (the turning condition of the vehicle 1).

The order value for the rear-differential controller 31 indicates the amount of movement of the driving torque between the right and left wheels 14R and 14L, or more specifically, the order value stands for the oil pressure of the right-left wheel limiting mechanism 15.

The other order value for the center-differential controller 32 indicates the amount of the limitation of the different speed between the front wheels 8 and the rear wheels 14, or more specifically, the order value stands for the oil pressure of the front-rear wheel limiting mechanism 19.

The other order value for the brake controller 33 indicates the amount of increasing or decreasing the brake pressure for each of the brakes 21R, 21L, 22R and 22L, more specifically, the order value stands for the oil pressure of the individual brakes 21R, 21L, 22R and 22L.

Now follows discussion about the yaw motion controlling map 44: As shown in FIG. 2, in the yaw motion controlling map 44, the degree of under-steering or over-steering at the vehicle 1 is defined as the horizontal axis. The degree of under-steering or over-steering is obtained from the turning condition of the vehicle 1; the controlled yaw-momentum $M_{Z-C}$ obtained by the controlled yaw momentum calculator 41 and the result of US/OS determined by the US/OS distinguisher 42.

In the yaw motion controlling map 44, the absolute values of the order values for each of the rear-differential controller 31, the center-differential controller 32 and the brake controller 33 are represented by the vertical axis.

Further, in the yaw motion controlling map 44, an anti-over-steering area 44A and an anti-under-steering area 44B are defined.

In the anti-over-steering area 44A, a rear-center differential control area 44A$_1$ and a brake control area 44A$_2$ are defined in ascending order of the controlled yaw-momentum $M_{Z-C}$.

In the anti-under-steering area 44B, a rear differential control area 44B$_1$ and a brake control area 44B$_2$ are defined in ascending order of the controlled yaw-momentum $M_{Z-C}$.

More specifically, when the yaw motion at the vehicle 1 should be reduced (in other words, the degree of over-steering should be reduced at the vehicle 1), the yaw motion controller 43 increases a driving torque at a inside wheel, which is one of the right wheel 14R and the left wheel 14L and which is closer to a center axis of turning, through the rear-differential controller 31, and increases the limitation on the speed difference between the front wheels 8 and the rear wheels 14 through the center-differential controller 32.

Further, the yaw motion controller 43 increases the brake pressure of an outer-side wheel, which is an opposite side of the inside wheel of the wheels 14R and 14L, more than the inside wheel's brake pressure through the brake controller 33, only when the degree of over-steering at the vehicle 1 should be reduced and the controlled yaw-momentum $M_{Z-C}$ is unsatisfied even when the right-left wheel driving torque adjustment is executed by the rear-differential controller 31 and the front-rear wheels speed limitation is executed by the center-differential controller 32.

On the other hand, when the yaw motion of the vehicle 1 should be increased (in other words, the degree of under-steering should be reduced at the vehicle 1), the yaw motion controller 43 increases the driving torque at the outer-side wheel through the rear-differential controller 31.

Further, the yaw motion controller 43 increases the brake pressure of the outer-side wheel more than the inside wheel's brake pressure through the brake controller 33, only when the under-steering at the vehicle 1 should be reduced and the controlled yaw-momentum $M_{Z-C}$ is unsatisfied even when the right-left wheel driving torque adjustment is executed by the rear-differential controller 31 and the front-rear wheel speed limitation is executed by the center-differential controller 32.

In other words, the yaw motion controller 43 does not execute the control using the center-differential controller 32 when it is necessary to reduce the degree of under-steering should be reduced, whereas when it is necessary to reduce the degree of over-steering, the yaw motion controllers 43 does execute control using the center-differential controller 32.

The operation and effect of the present invention of this embodiment will now be described as follows.

Figure 3:
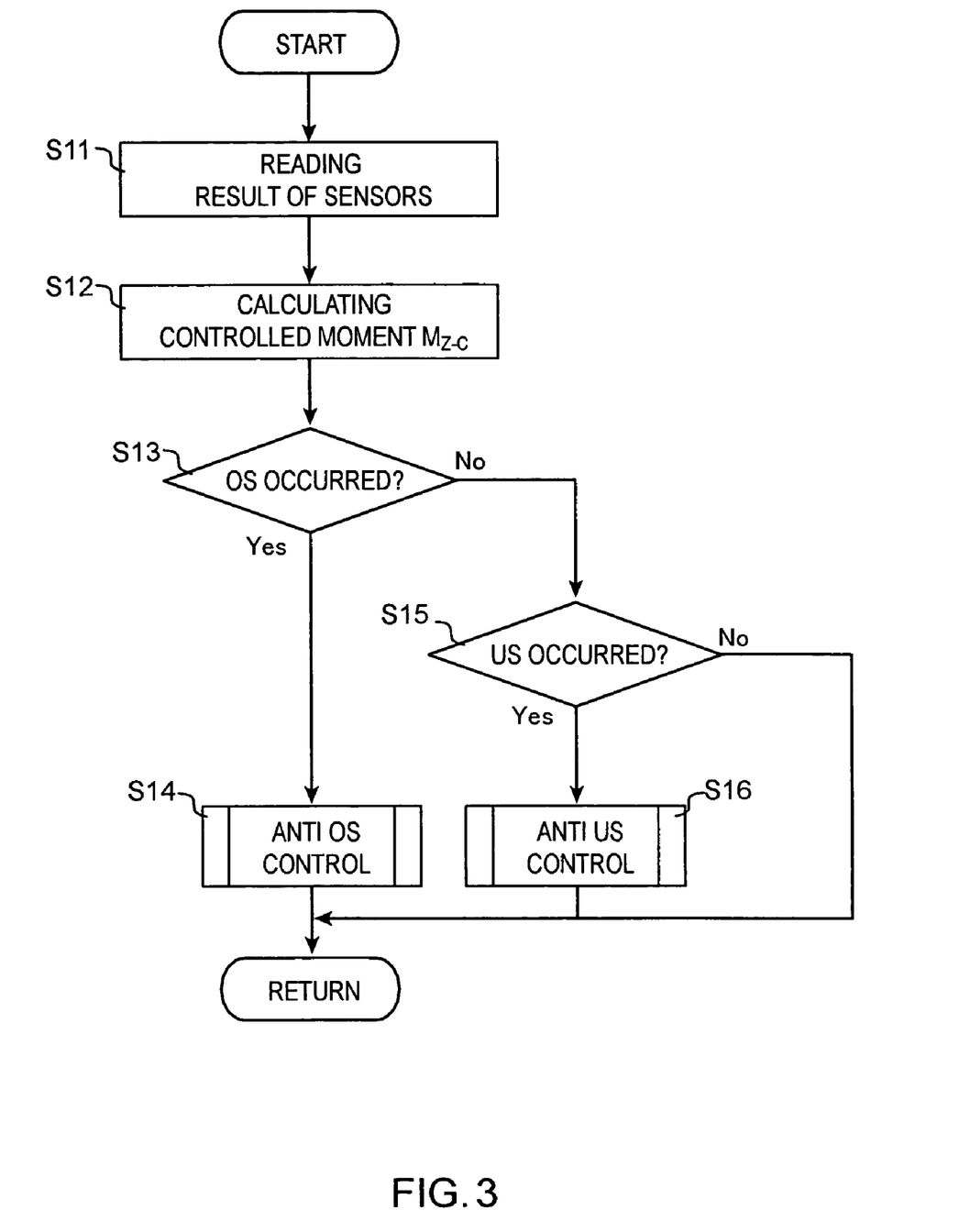
FIG. 3 is a flow chart schematically showing the control in the embodiment of the present invention.

At step S11 in FIG. 3, the controlled yaw momentum calculator 41 reads the steering angle $\delta_{SW}$ sensed by the steering wheel sensor, the vehicle's velocity $v_B$ sensed by the vehicular velocity sensor and the actual yaw-rate $\gamma_R$ sensed by the yaw-rate sensor. In addition, the US/OS distinguisher 42 reads the lateral acceleration $G_Y$ sensed by the G sensor.

Further, the controlled yaw momentum calculator 41 calculates the target yaw-rate $\gamma_T$ based on the read steering angle $\delta_{SW}$ and the velocity $v_B$, then the calculator 41 calculates the controlled yaw-momentum $M_{Z-C}$ by comparing the calculated target yaw-rate $\gamma_T$ and actual yaw-rate $\gamma_R$ (step S12).

Then the US/OS distinguisher 42 distinguishes whether over-steering or under-steering or substantially neither over-steering nor under-steering is occurring at the vehicle 1 based on the controlled yaw-momentum $M_{Z-C}$ and the lateral acceleration $G_Y$. (steps S13 and S15)

When the US/OS distinguisher 42 distinguishes that over-steering is occurring at the vehicle 1 ("Yes" at step S13), an anti-over-steering control is executed as a sub-routine (step S14). The anti-over-steering control will be described below accompanying FIG. 4.

On the other hand, when the US/OS distinguisher 42 distinguishes that under-steering is occurring at the vehicle 1 ("No" at step S13 and "Yes" at step S15), an anti-under-steering control is executed as another sub-routine (step S16). The anti-under-steering control will be described below accompanying FIG. 5.

When the US/OS distinguisher 42 distinguishes neither of over-steering nor under-steering happen at the vehicle 1 ("No" at step S13 and "No" at step S15), the control is simply returned to the start.

Figure 4:
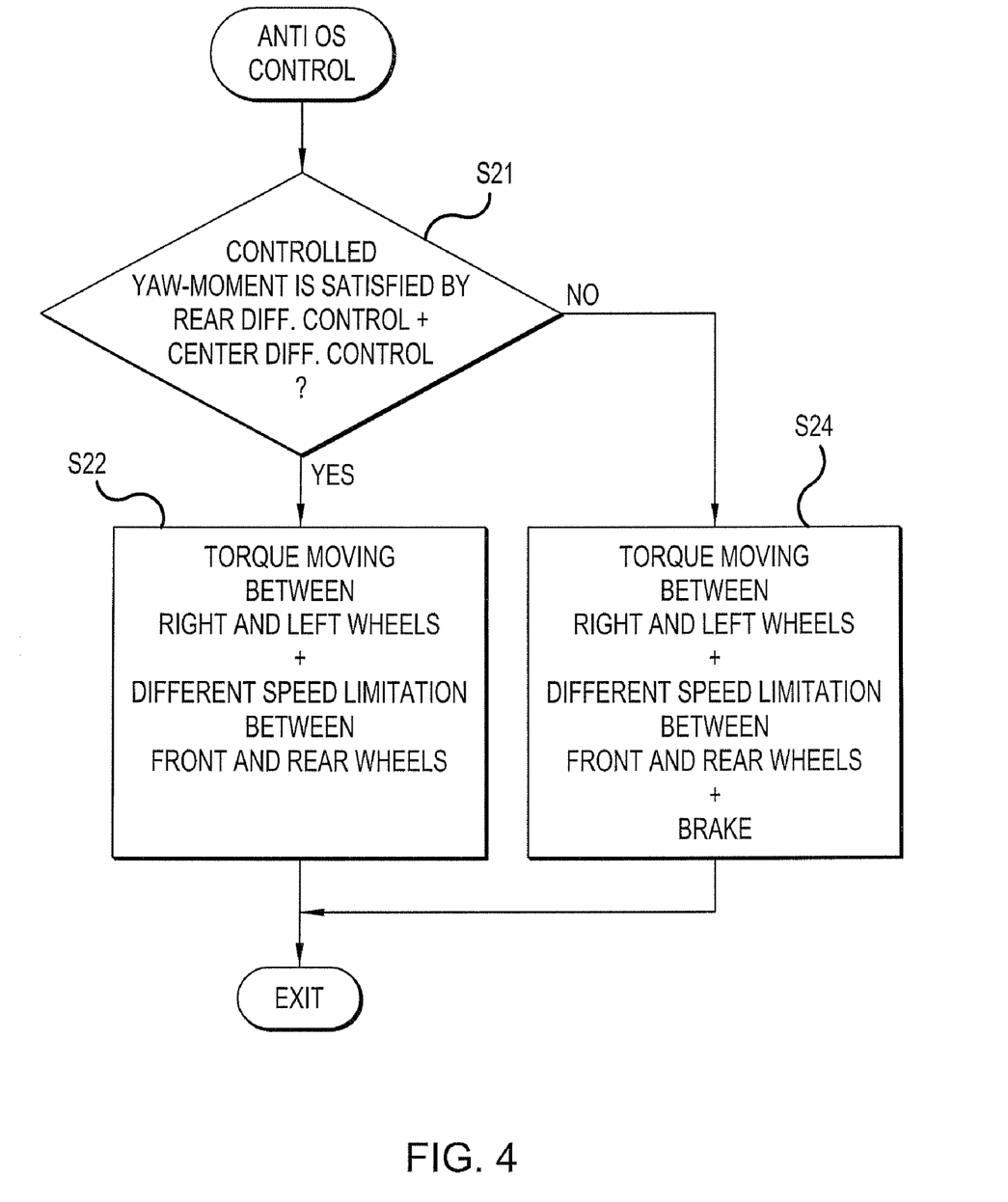
FIG. 4 is another flow chart schematically showing a sub-routine for reducing over-steer condition in the embodiment of the present invention.

Now the anti-over-steering control is described as shown in FIG. 4. In the anti-over-steering control, at step S21, whether the controlled yaw-momentum $M_{Z-C}$ is satisfied or not by executing the adjustment of driving torque distributed to each of the rear wheels 14R and 14L by the rear-differential controller 31 (the adjustment is called the rear differential control) and the limitation of front-rear wheel speed by the center-differential controller 32 (the limitation is called the center differential control) is established.

If it is distinguished that the controlled yaw-momentum $M_{Z-C}$ is satisfied by executing the rear differential control and/or the center differential control ("Yes" at step S21), the different torque between the rear wheels 14R and 14L and the different speed between the front wheels 8 and rear wheels 14 are adjusted by executing the rear differential control and the center differential control so as to reduce the degree of over-steering which take place at the vehicle 1 (step S22).

On the other hand, if it is distinguished that the controlled yaw-momentum $M_{Z-C}$ is not satisfied even when the rear differential control and/or the center differential control are/is executed ("No" at step S21), then the rear differential control and the center differential control are executed. Further, a brake control is executed by the brake controller 33 setting the brake pressure in such a manner that the brake pressure of the outer-side wheel is higher than the brake pressure of the inside wheel so as to further reduce over-steering at the vehicle 1 (step S23).

Figure 5:
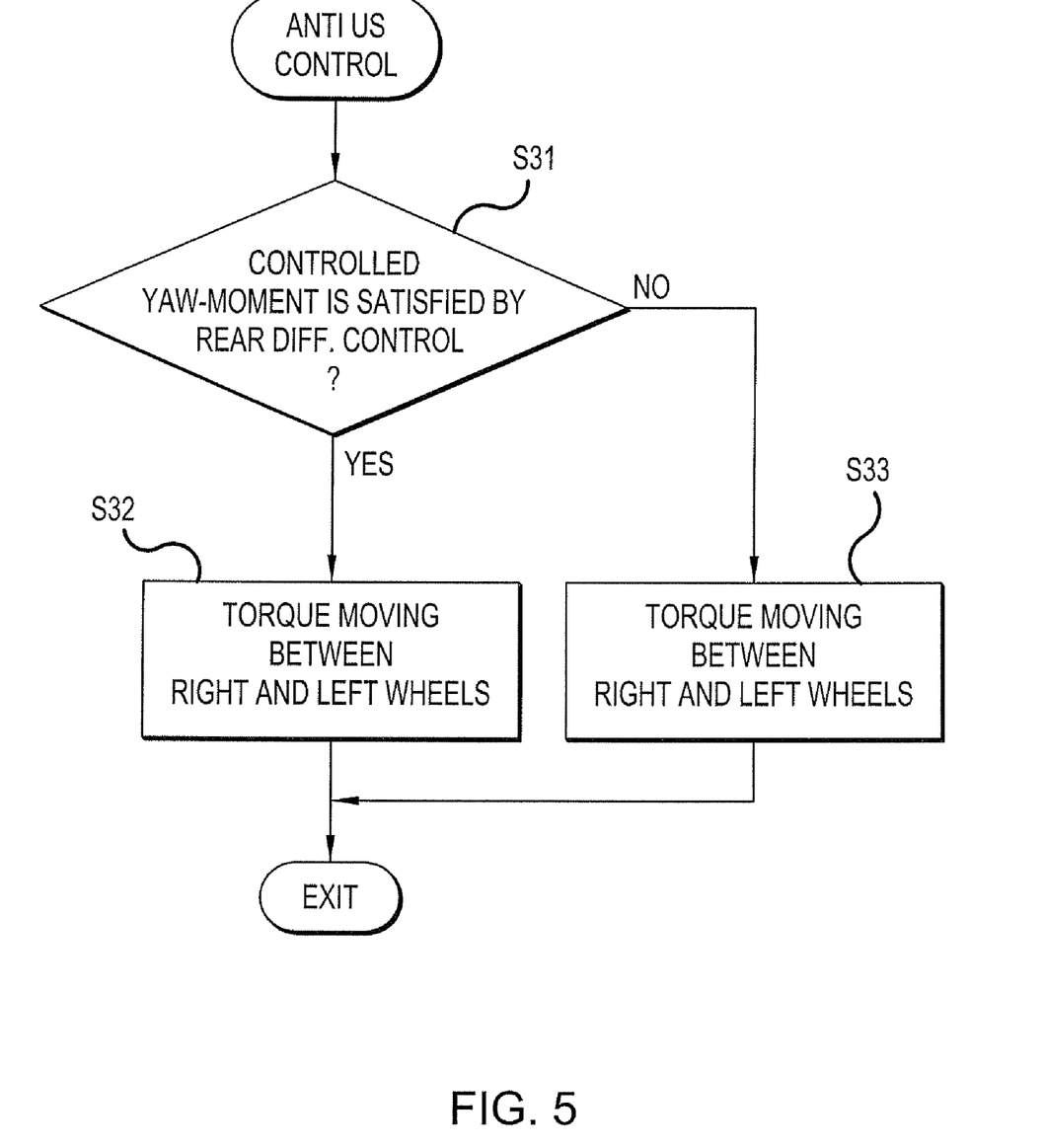
FIG. 5 is another flow chart schematically showing another sub-routine for reducing the under-steer condition in the embodiment of the present invention

Now the anti-under-steering control is described as shown in FIG. 5. At step S31, it is determined whether the controlled yaw-momentum $M_{Z-C}$ is satisfied or not when the rear differential control is executed.

If it is determined that the controlled yaw-momentum $M_{Z-C}$ is satisfied by executing the rear differential control ("Yes" at step S31), the driving torque between the rear wheels 14R and 14L is adjusted by executing the rear differential control so as to reduce the degree of under-steering at the vehicle 1 (step S32).

On the other hand, if it is distinguished that the controlled yaw-momentum $M_{Z-C}$ is not satisfied even when the rear differential control is executed ("No" at step S31), then the rear differential control is executed.

Further, the brake control is executed in such a manner that the brake pressure of the inside wheel is higher than the brake pressure of the outer-side wheel so as to further reduce the degree of under-steering at the vehicle 1 (step S33).

Namely, this embodiment of the present invention can provide the following effects and/or advantages.

In the case of reducing the yaw motion of the vehicle 1, the limitation of different speeds between the front wheels 8 and the rear wheels 14 is increased and the driving torque of the inside wheel is also increased, consequently, the turning ability of the vehicle 1 is improved and the acceleration ability of the vehicle 1 is secured.

Only when it is impossible to reduce adequately over-steering of the vehicle 1 even the right-left wheels driving torque adjustment is executed by the rear-differential controller 31 and the front-rear wheels speed limitation between the front wheels 8 and the rear wheels 14 is executed by the center-differential controller 32, then the outer-side wheel's brake pressure is increased.

Consequently, it is possible to avoid lowering acceleration performance, as well as being possible to improve the turning performance of the vehicle 1.

On the other hand, only when it is impossible to reduce adequately the degree of under-steering of the vehicle 1, even though the right-left wheel driving torque adjustment has already been executed by the rear-differential controller 31, is the inside wheel brake pressure increased. Consequently, it is possible to avoid lowering acceleration performance, while it is possible to improve the turning performance of the vehicle 1.

Contrary to the present invention, according to the prior art, in the case of over-steering, the inside wheel's torque is carelessly increased even if the traction of the inside wheel is decreased. Consequently, it is impossible to generate a counter yaw against the over-steering due to slipping at the inside wheel. Further, slipping occurs more easily when a vehicle is accelerating, whereas, the present invention can avoid such an event.

Furthermore, according to the prior art, when under-steering or over-steering occurs and runs slowly, the driving torque is simply adjusted between the right and left rear wheels even when the traction of the rear wheels is decreased. Accordingly, it is impossible to generate counter yaw against under-steering and over-steering. Conversely, the present invention is makes it possible to resolve such problems.

As described above, the present invention is not limited to the above embodiments, but covers all changes and modifications which do not constitute departures from the spirit and scope of the invention.

In the above embodiment, the front differential 6 that is the torque-sensing type of differential that can mechanically limit the speeds difference between the right and left wheels 8R and 8L corresponds to the torque input from the engine 2. However, it is acceptable to use another type of differential as the front differential 6.

Further, it is acceptable to apply the right-left wheel limiting mechanism 15 to not only the rear-differential 12 but also the front-differential 6.

Furthermore, in the above embodiment, the controller 31 adjusts the individual driving torque of the rear wheels 14R and 14L from the engine 1, but the present invention is not limited to the above embodiments.

For example, it is acceptable to equip two motors connected to each of the right wheel and left wheel and to adjust the motor's torques, individually.

In this case, it is possible to equip further such driving sources as motors and/or engines at the vehicle.

Further, it is possible to adopt a mechanism to distribute the driving torque between the right and left wheels instead of the right-left wheel limiting mechanism 15. An example of such a mechanism may include clutch mechanisms at each of the right and left wheels to adjust the clutch pressures individually. Furthermore, it is also acceptable to equip a driving torque distribution mechanism at either of the front or rear wheels.

In the above embodiment, the front-rear wheels limiting mechanism 19 is comprised by gears, however, it is not limited to such a gear mechanism. It is also acceptable to use any type of limited mechanisms which have a corresponding function to the front-rear wheel limiting mechanism 19.

What is claimed is:

1. A turning control apparatus for a vehicle having at least four wheels, comprising:
    a first yaw controller for adjusting driving torque of at least one of a left wheel and a right wheel;
    a second yaw controller for adjusting a speed difference between a front wheel and a rear wheel;
    an integrated yaw controller for controlling yaw momentum of the vehicle by managing said first yaw controller and said second yaw controller;
    means for detecting an actual yaw on the vehicle;
    means for setting a target yaw relative value indicative of yaw to be generated on the vehicle;
    brake units for individually reducing the speed of each of the all wheels by individually varying a brake pressure of each wheel; and
    a third yaw controller for adjusting the brake pressure of at least one of the brake units of the right wheel and the left wheel;
    means for sensing a lateral acceleration; and
    a US/OS distinguisher for distinguishing whether over-steering or under-steering or substantially neither over-steering nor under-steering is occurring at said vehicle based on said sensed lateral acceleration, wherein
    when the yaw of the vehicle is required to be reduced, based on a result of the distinguishing by said US/OS distinguisher,
    said integrated yaw controller controls:
    said first yaw controller to increase the driving torque of at least one of the left wheel and the right wheel closer to a center axis of turning;
    said second yaw controller to decrease the speed difference between the front of the right wheel and the left wheel and the rear of the right wheel and the left wheel; and
    said third yaw controller to increase the brake pressure of one of the left wheel and the right wheel driving torque of which is not adjusted by said first yaw controller and further away from the center axis of turning only when the actual yaw, detected by said actual yaw detecting means on the vehicle under control by said first and second yaw controllers, cannot be reduced to the target yaw relative value, set by said target yaw relative value setting means.

2. The turning control apparatus according to claim 1 further comprising:
    when the yaw of the vehicle is required to be increased, based on the result of the distinguishing by the US/OS distinguisher,
    said integrated yaw controller controls:
    said first yaw controller to increase the driving torque of at least one of the left wheel and the right wheel further away from the center axis of turning; and
    said third yaw controller to increase the brake pressure of one of the left wheel and the right wheel driving torque of which is not adjusted by said first yaw controller and closer to a center axis of turning when the actual yaw, detected by said actual yaw detecting means on the vehicle under control by said first yaw controller, cannot be increased to the target yaw relative value, set by said target yaw setting means.

* * * * *